Figures 1, 2:
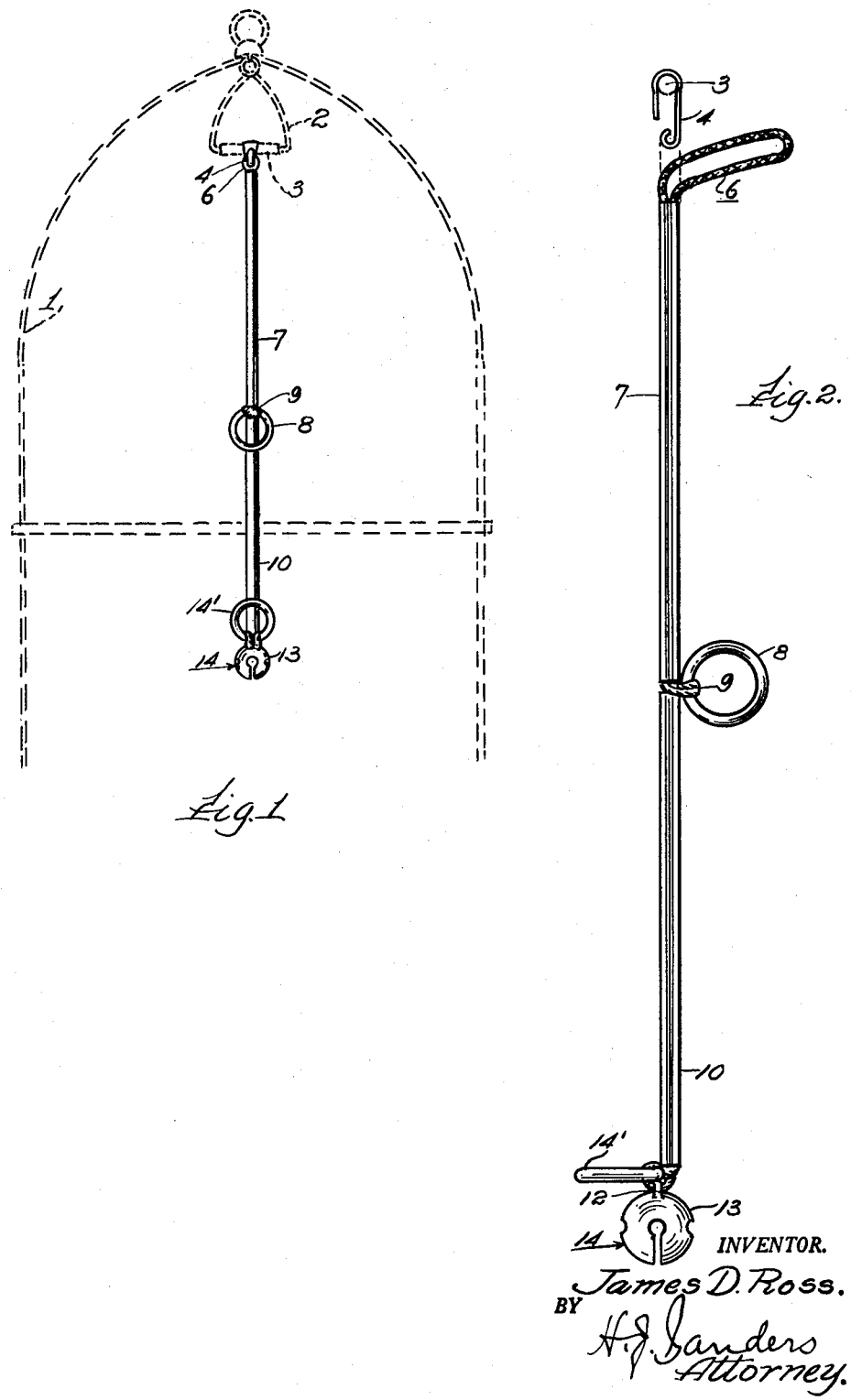

Sept. 20, 1955     J. D. ROSS     2,718,209

BIRD PERCH AND EXERCISER

Filed Feb. 25, 1954

INVENTOR.
James D. Ross.
BY H. J. Sanders
Attorney.

United States Patent Office 2,718,209
Patented Sept. 20, 1955

2,718,209

BIRD PERCH AND EXERCISER

James Dewane Ross, Chicago, Ill.

Application February 25, 1954, Serial No. 412,449

1 Claim. (Cl. 119—26)

This invention relates to bird toys or exercisers and to what may be termed a "swing-type" toy for birds, specifically parakeets. The toy may be suspended inside the cage or outside same and when arranged outside the cage it may be secured to a light fixture in the room or to other suitable support.

One object is to provide a bird toy that in addition to being a bird swing may serve as a type of perch for the bird upon which he may alight, pose in different attitudes and/or by his bodily movements upon the perch ring a small bell attached to the perch which it has been found will interest the bird and in time cause or teach him to repeat the "act" in order to hear the sound of the bell, all of which will be interesting and entertaining to the bird owner and others.

A further object is to provide a bird toy that will prove attractive to the bird and cause him to exercise himself in the use of the toy. A still further object is to provide a bird toy that may be used by the bird without danger of bodily injury, that is inexpensive to manufacture, substantially unbreakable, attractive in appearance and useful in a variety of ways.

Further objects and advantages of my improvements will be more readily apparent from the following description of a preferred embodiment thereof as illustrated in the accompanying drawing, and as defined in the claim.

In the drawing:

Fig. 1 is a view of the toy illustrating one application of same to a bird cage, the latter denoted in broken lines, and, Fig. 2 is an enlarged view of the toy per se.

The reference numeral 1 denotes a conventional bird cage which may be provided at the top with a yoke 2 which here includes a short bar 3 to which a metal hook 4 preferably of the snap-on type may be releasably secured to support the toy, the lower end of the hook wrapped about the exposed loop-forming portion of the braided cord 6 doubled or folded, this cord extending through the desirably plastic tube 7 and out the lower end thereof and then passed through and knotted or interlaced to the plastic ring 8 as at 9, the cord then passing through the immediately adjacent lower tube 10 and out the lower end thereof, the cord then passing through an eye 12 in the shell or housing 13 of the tinkle-bell 14 securing same immediately adjacent the lower end of said lower tube and then being knotted or interlaced to a second plastic ring 14, the ends of the cord knotted or otherwise secured together.

The cord secures the tubes together while also securing the rings and bell to the tubes, the rings being secured to the tubes at an angle thereto and affording perch means for the bird without the possibility of entangling him and the bell is so secured to the lower tube as to cause the bell to tinkle audibly when the bird perches upon any part of the swing.

The cord is easily and readily introduced into and drawn or forced or threaded through the tubes with a piece of wire and knotted or interlaced about the rings and by stretching the cord slightly or tieing the cord ends, or stitching same, together to slightly shorten the cord length between the tie point and the remote or fold point of the cord the tension upon the rings may be increased more or less to cause them to yieldingly retain their set angle with the tubes, under the weight of the bird, to facilitate their use as perches for birds, parakeets or others, of different sizes, weights or activities; and further, a ring may be cleansed when dirty by rotating it manually to remove the dirt frictionally upon the cord, the cord when soiled being readily cleansed or removed and replaced by a new clean one.

What is claimed is:

In a bird swing and perch, identical tubular plastic members, a braided flexible member folded upon itself and extending removably through and beyond said tubular members securing same to each other in short spaced relation, said flexible member extending outwardly beyond one end of one tubular member defining a loop, said flexible member completely filling both tubular members from end to end but yieldingly movable longitudinally of said members, a ring perch adjustably but tightly interlaced to said flexible member at the adjacent ends of said tubular members, said ring thereby yieldingly retained in adjusted position by said flexible member, said flexible member when stretched manually tightening said ring in position, a hook for securing said loop to a support, and a tinkle-bell interlaced to said flexible member adjacent one end of one of said tubular members, said bell operative by the bird when he contacts any portion of the swing.

References Cited in the file of this patent

UNITED STATES PATENTS

| D. 89,823 | Robison | May 16, 1933 |
| 2,483,003 | Fischer | Sept. 27, 1949 |
| 2,487,087 | Anderson | Nov. 8, 1949 |

FOREIGN PATENTS

| 671,685 | Germany | Feb. 11, 1939 |